(12) United States Patent
Awata

(10) Patent No.: US 8,345,040 B2
(45) Date of Patent: Jan. 1, 2013

(54) INFORMATION PROCESSING SYSTEM AND INFORMATION PROCESSING APPARATUS

(75) Inventor: Satoshi Awata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1084 days.

(21) Appl. No.: 12/291,759

(22) Filed: Nov. 13, 2008

(65) Prior Publication Data

US 2009/0122080 A1    May 14, 2009

(30) Foreign Application Priority Data

Nov. 14, 2007   (JP) ................................. 2007-295168

(51) Int. Cl.
 *G06T 15/00* (2011.01)
 *G06F 3/048* (2006.01)
(52) U.S. Cl. .......................... 345/419; 715/790; 715/794
(58) Field of Classification Search .................... None
 See application file for complete search history.

(56) References Cited

U.S. PATENT DOCUMENTS

| 8,127,248 | B2* | 2/2012 | Ording et al. ................. 715/790 |
| 2003/0142135 | A1* | 7/2003 | Hori et al. ..................... 345/781 |
| 2004/0066414 | A1* | 4/2004 | Czerwinski et al. .......... 345/781 |
| 2005/0125742 | A1* | 6/2005 | Grotjohn et al. ............... 715/799 |
| 2006/0053385 | A1 | 3/2006 | Van Leeuwen |

FOREIGN PATENT DOCUMENTS

| CN | 1739096 | 2/2006 |
| JP | 04-204997 | 7/1992 |
| JP | 06-266523 | 9/1994 |
| JP | 06-282401 | 10/1994 |
| JP | 11-355489 | 12/1999 |
| JP | 2005-149440 | 6/2005 |
| JP | 2005-215823 | 8/2005 |
| JP | 2003-223254 | 8/2008 |

* cited by examiner

*Primary Examiner* — Kee M Tung
*Assistant Examiner* — Leon T Cain, II
(74) *Attorney, Agent, or Firm* — Edwards Wildman Palmer LLP; David G. Conlin; Steven M. Jensen

(57) ABSTRACT

A display state of input data and a setting dialog on a display screen is determined to display the setting dialog at an appropriate position based on a determination result. An information processing system includes a scanner apparatus for inputting data and a PC for displaying input data input by the scanner apparatus on a display screen of a large-sized display. The PC includes a display control portion for displaying the input data and the setting dialog for setting document reading conditions relating to the input data on the display screen, and a display state determining portion for determining a display state of the input data and the setting dialog. The display control portion controls a display position of the setting dialog based on a determination result by the display state determining portion.

7 Claims, 13 Drawing Sheets

FIG. 3

| | WINDOW SIZE | |
| --- | --- | --- |
| | LATERAL PIXEL NUMBER | VERTICAL PIXEL NUMBER |
| 141 — SETTING DIALOG | 550 | 300 |
| 142 — SETTING DIALOG (REDUCED) | 500 | 200 |
| 143 — DISPLAY | 1920 | 1080 |
| 144 — PROCESSING IN THE CASE OF HAVING A PLURALITY OF INPUT DATA | DISPLAY SO AS NOT TO OVERLAP THE TOP INPUT DATA | |

| IMAGE | IMAGE POSITION | | IMAGE SIZE | | Z ORDER |
|---|---|---|---|---|---|
| | X | Y | LATERAL PIXEL NUMBER | VERTICAL PIXEL NUMBER | |
| 1 | 200 | 50 | 600 | 400 | 1 |
| 2 | 900 | 50 | 900 | 1000 | 2 |

FIG. 4B

| IMAGE | IMAGE POSITION | | IMAGE SIZE | | Z ORDER |
|---|---|---|---|---|---|
| | X | Y | LATERAL PIXEL NUMBER | VERTICAL PIXEL NUMBER | |
| 1 | 200 | 100 | 600 | 400 | 3 |
| 2 | 700 | 300 | 600 | 600 | 2 |
| 3 | 1000 | 100 | 600 | 600 | 1 |

FIG. 4C

| IMAGE | IMAGE POSITION | | IMAGE SIZE | | Z ORDER |
|---|---|---|---|---|---|
| | X | Y | LATERAL PIXEL NUMBER | VERTICAL PIXEL NUMBER | |
| 1 | 200 | 100 | 600 | 800 | 3 |
| 2 | 700 | 300 | 600 | 600 | 2 |
| 3 | 1000 | 100 | 600 | 600 | 1 |

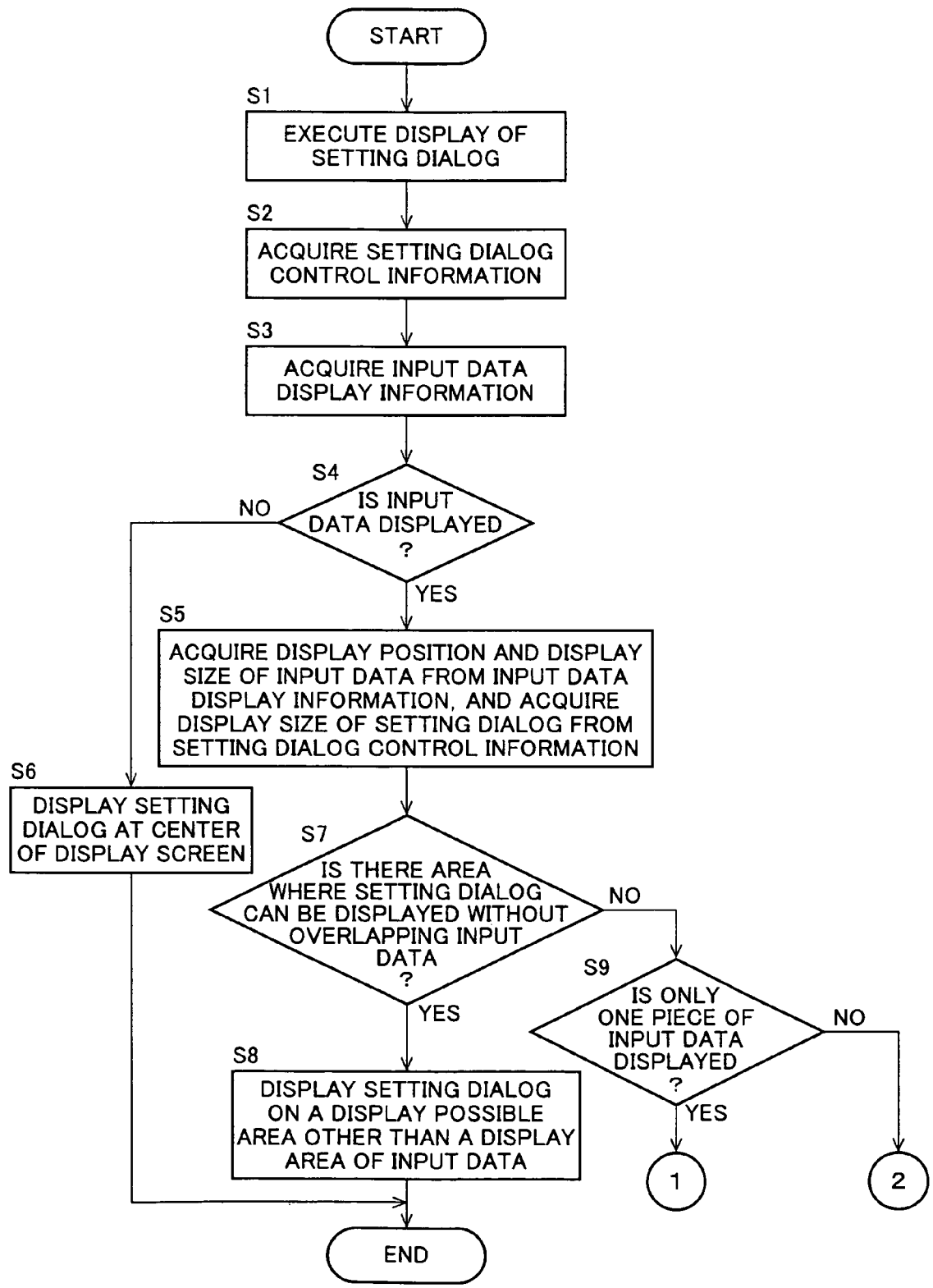

INFORMATION PROCESSING SYSTEM AND INFORMATION PROCESSING APPARATUS

CROSS-NOTING PARAGRAPH

This Nonprovisional application claims priority under 35 U.S.C. §119(a) on Patent Application No. 2007-295168 filed in JAPAN on Nov. 14, 2007, the entire contents of which are hereby incorporated herein by references.

FIELD OF THE INVENTION

The present invention relates to an information processing system and an information processing apparatus, and more specifically, to an information processing system that controls to display a window screen of an application executed in an information processing apparatus such as a PC (personal computer) on a display, and an information processing apparatus that constitutes the system.

BACKGROUND OF THE INVENTION

In recent years, a conference system using a large-sized liquid crystal display has been proposed, and there has been increased such a case that documents provided by attendants are read by a scanner apparatus (an image reading apparatus) and a conference is progressed with the images read by the scanner displayed on the large-sized liquid crystal display. The scanner apparatus is connected to a PC, and a document reading conditions setting screen (a setting dialog) for setting reading conditions such as a color mode, a resolution, and a size in the scanner apparatus are provided in the PC side. When a user causes the scanner apparatus to read a document, the user operates the PC to display the setting dialog on the large-sized liquid crystal display so that various reading conditions can be set on the display.

In such a conference system, when a plurality of image data is displayed on the large-sized liquid crystal display at the same time, it is necessary to arrange the plurality of image data so as not to be overlapped with each other on a display screen as completely as possible and since one of the attendants is needed to perform such an operation alone, the attendant is bothered with the operation and cannot concentrate on the conference.

On the other hand, for example, Japanese Laid-Open Patent Publication No. 2005-149440 describes a method for easily adjusting overlap conditions of image data when a plurality of image data is simultaneously displayed on a screen during a conference. According to the method, based on display constitution information of each window (an identifier, a position, a size and an overlap condition of each window) displayed on a shared display, the display constitution of each window can be changed.

However, in the conventional method described in the Japanese Laid-Open Patent Publication No. 2005-149440, a display position of a setting dialog that is displayed at the time of reading by a scanner apparatus is not considered. Thus, for example, when the setting dialog is displayed on a display in order to read a new document during a conference, the setting dialog is displayed on the image data that is displayed on the display as a subject of discussion and the image data can not be seen, and this may raise a problem that the conference is interrupted.

SUMMARY OF THE INVENTION

An object of the present invention is to provide an information processing system wherein a display state of input data and a setting dialog on a display screen is determined, and based on a determination result, the setting dialog can be displayed at an appropriate position, and an information processing apparatus that constitutes the system.

Another object of the present invention is to provide an information processing system, comprising: a data input apparatus for inputting data; and an information processing apparatus for displaying input data input by the data input apparatus on a display screen, wherein the information processing apparatus includes a display control portion for displaying the input data and a setting dialog for setting predetermined conditions relating to the input data on the display screen, and a display state determining portion for determining a display state of the input data and the setting dialog, and the display control portion controls a display position of the setting dialog based on a determination result by the display state determining portion.

Another object of the present invention is to provide the information processing system, wherein when the display state determining portion determines that the input data is not displayed on the display screen, the display control portion displays the setting dialog at the center of the display screen.

Another object of the present invention is to provide the information processing system, wherein when the display state determining portion determines that there is no area where the setting dialog can be displayed without overlapping the input data, the display control portion displays the setting dialog at the center of the display screen.

Another object of the present invention is to provide the information processing system, wherein when the display state determining portion determines that there are a plurality of input data displayed on the display screen and there is no area where the setting dialog can be displayed without overlapping the plurality of input data, the display state determining portion further determines an overlapping order of the plurality of input data, and the display control portion controls a display position of the setting dialog based on a determination result of the overlapping order by the display state determining portion.

Another object of the present invention is to provide the information processing system, wherein the display control portion displays the setting dialog so as not to overlap the input data displayed on the top of the overlapping plurality of input data on the display screen.

Another object of the present invention is to provide the information processing system, wherein the display control portion displays the setting dialog so as to overlap the input data displayed on the bottom of the overlapping plurality of input data on the display screen.

Another object of the present invention is to provide the information processing system, wherein when the display state determining portion determines that there is an area where the setting dialog can be displayed without overlapping the input data, the display control portion displays the setting dialog on an area where the setting dialog can be arranged without overlapping a display area of the input data.

Another object of the present invention is to provide the information processing system, wherein when the display state determining portion determines that there is no area where the setting dialog can be displayed without overlapping the input data, the display control portion displays the setting dialog after reducing it on the display screen.

Another object of the present invention is to provide the information processing system, wherein the data input apparatus is a document reading apparatus that optically reads a document and inputs data.

Another object of the present invention is to provide the information processing system, wherein the setting dialog permits setting of a parameter relating to reading conditions when the document reading apparatus reads a document.

Another object of the present invention is to provide the information processing system, wherein the display screen is a display screen of an external display apparatus connected to the information processing apparatus.

Another object of the present invention is to provide an information processing apparatus which constitutes the information processing system.

BRIEF DESCRIPTION OF THE DRAWINGS

FIG. 3 is a view showing an example of setting dialog control information for controlling display of a setting dialog;

FIGS. 4A to 4F are views showing an example of input data display information for controlling display of input data;

FIG. 5 is a flowchart illustrating an example of a method for controlling display of a setting dialog by the information processing system of the present invention;

PREFERRED EMBODIMENTS OF THE INVENTION

Now, referring to the accompanying drawings, preferred embodiments of an information processing system of the present invention and an information processing apparatus that constitutes the information processing system will hereinafter be described.

Figure 1:
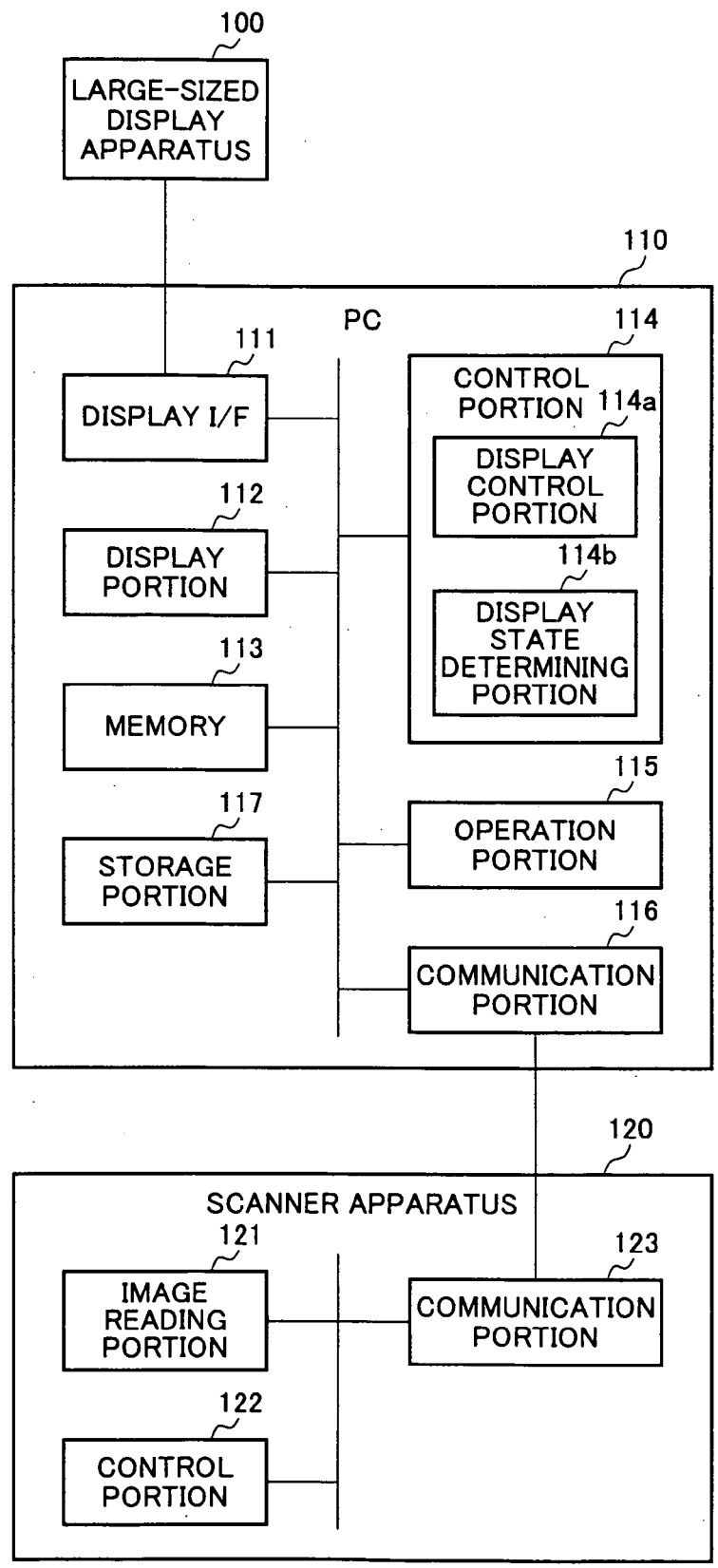
FIG. 1 is a block diagram showing a structural example of an information processing system according to an embodiment of the present invention.

FIG. 1 is a block diagram showing a structural example of the information processing system according to an embodiment of the present invention, where 100 denotes a large-sized display apparatus (hereinafter, referred to as a large-sized display), 110 denotes an information processing apparatus such as a personal computer (hereinafter, referred to as a PC), and 120 denotes a document reading apparatus (hereinafter, referred to as a scanner apparatus). The PC 110 is connected to the large-sized display 100 and the scanner apparatus 120, and is able to display image data of material read by the scanner apparatus 120 on the large-sized display 100.

The large-sized display 100 is a monitor such as an LCD (Liquid Crystal Display), on which image information and character information transmitted from the PC 110 are displayed. The large-sized display 100 is a display apparatus on which input data such as images and characters, and a setting dialog are displayed, and although the large-sized liquid crystal display is used in the present embodiment, a display used in a general desktop personal computer or a laptop personal computer, a projector apparatus, or the like is also applicable.

The PC 110 is a general purpose personal computer, and includes a display I/F 111 for connecting the computer to the large-sized display 100, a display portion 112 composed of an LCD and the like for displaying input data such as images and characters, a memory 113 composed of a ROM, a RAM, and the like for storing a control program, data and the like, a control portion 114 composed of a CPU and the like for controlling an entire function of the PC 110, an operation portion 115 composed of an input device such as a mouse and a keyboard, a communication portion 116 for connecting the computer to the scanner apparatus 120 through a LAN (Local Area Network), a USB (Universal Serial Bus), or the like so as to be able to perform communication, and a storage portion 117 composed of a hard disc and the like for storing various application programs, image data, and the like.

The scanner apparatus 120 includes an image reading portion 121 for optically reading data on a paper to input the image data on the paper, a control portion 122 composed of a CPU and the like for controlling an entire function of the scanner apparatus 120, and a communication portion 123 for connecting the scanner apparatus 120 to the PC 110 through a LAN or a USB so as to be able to perform communication.

Figure 2:
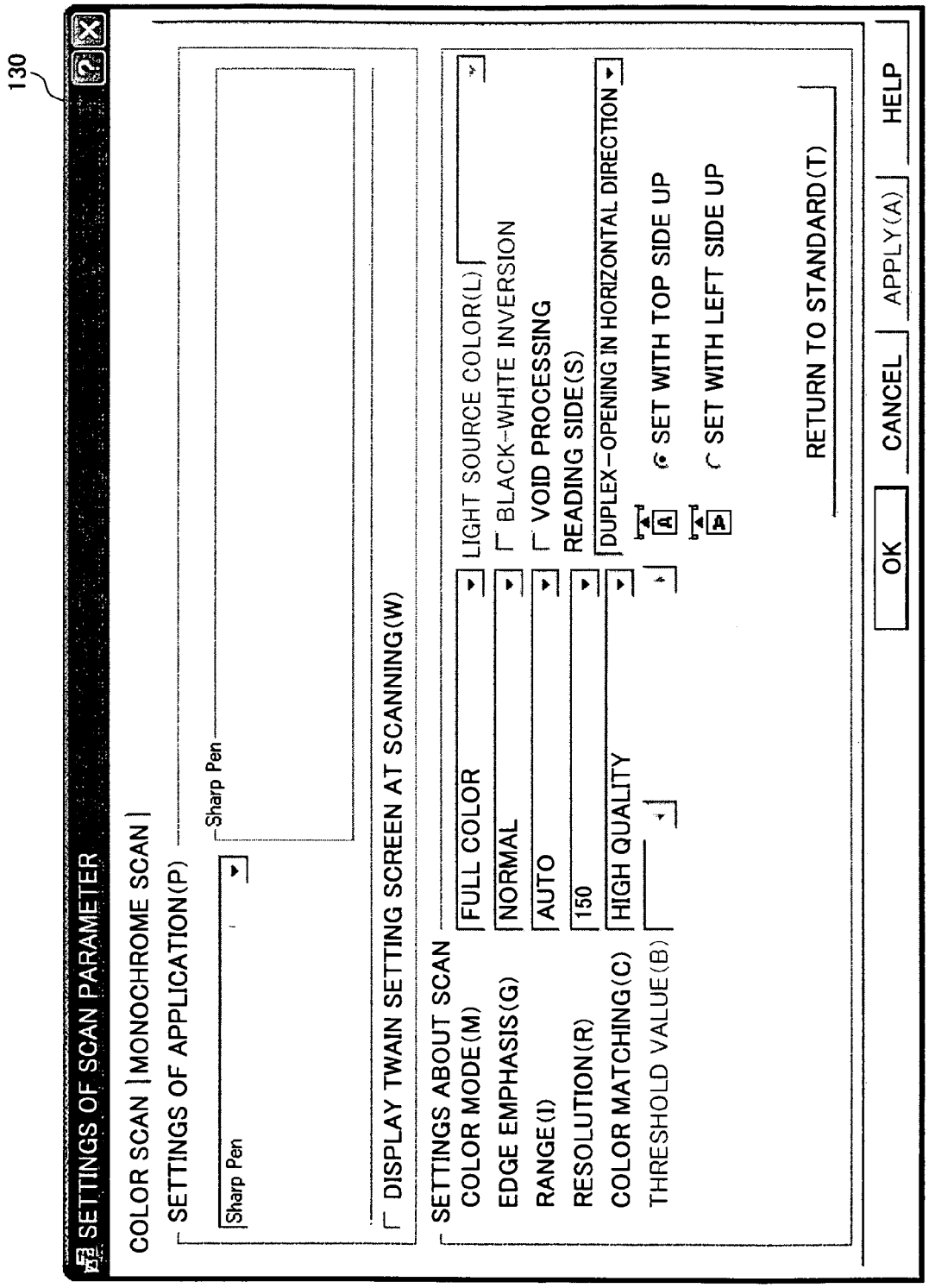
FIG. 2 is a view illustrating an example of a setting dialog for setting document reading conditions in a scanner apparatus.

FIG. 2 is a view illustrating an example of a setting dialog for setting document reading conditions in the scanner apparatus 120, where 130 denotes a setting dialog. As described above, the setting dialog 130 is a document reading conditions setting screen that is displayed by an application for setting document reading conditions in the scanner apparatus 120, which can be displayed on the large-sized display 100 by a user's operation on the PC 110. In the setting dialog 130, it is possible to set reading conditions required for document reading, such as a color mode, an edge, a range, a resolution, color matching, a threshold value, a light source color, a black-white inversion, void processing, single-side/double-side specification.

A main characteristic of the present invention is to determine a display state of input data and a setting dialog on a display screen and display the setting dialog at an appropriate position based on a determination result.

Hence, the PC 110 includes a display control portion 114*a* that displays input data from the scanner apparatus 120 and the setting dialog 130 for setting document reading conditions relating to the input data on a display screen of the large-sized display 100, and a display state determining portion 114b that determines a display state of the input data and the setting dialog 130. The display control portion 114a controls a display position of the setting dialog 130 based on a determination result of the display state determining portion 114b.

For example, when the display state determining portion 114b determines that no input data is displayed on the display screen, the display control portion 114a displays the setting dialog 130 at the center of the display screen. In this way, by displaying the setting dialog 130 at the center of the display screen, it is possible to improve a visibility for an operator of the PC 110 and to perform an operation easily.

Moreover, when the display state determining portion 114b determines that there is no area where the setting dialog 130 can be displayed without overlapping input data, the display control portion 114a displays the setting dialog 130 at the center of the display screen. Similarly to the above, by displaying the setting dialog 130 at the center of the display screen, it is possible to improve a visibility for an operator of the PC 110 and to perform an operation easily.

Moreover, when the display state determining portion 114b determines that there are a plurality of input data displayed on the display screen and there is no area where the setting dialog 130 can be displayed without overlapping the plurality of input data, an overlapping order of the plurality of input data may be further determined. In this case, the display control portion 114a controls a display position of the setting dialog 130 based on a determination result of the overlapping order from the display state determining portion 114b.

For example, the display control portion 114a may display the setting dialog 130 so as not to overlap the input data that is displayed on the top of the plurality of input data on the display screen. This is because the input data displayed on the uppermost layer (on the top of the overlapping order) is often seen (discussed) during a conference, and by displaying the setting dialog 130 so as not to overlap the input data on the uppermost layer, the conference is prevented from interruption.

Moreover, the display control portion 114a may display the setting dialog 130 so as to overlap the input data displayed on the lowest layer of the plurality of input data on the display screen. This is because, contrary to the above, the input data displayed on the lowest layer (on the bottom of the overlapping order) is seldom seen (discussed) during a conference, and by displaying the setting dialog 130 so as to overlap the input data on the lowest layer, the conference is prevented from interruption.

Furthermore, when the display state determining portion 114b determines that there is an area where the setting dialog 130 can be displayed without overlapping the input data, the display control portion 114a may display the setting dialog 130 in an area where it can be arranged without overlapping the display areas of the input data. For example, by displaying the setting dialog 130 at the center of the above area, it is possible to improve a visibility for an operator of the PC 110 and to perform an operation easily.

Alternatively, when the display state determining portion 114b determines that there is no area where the setting dialog 130 can be displayed without overlapping the input data, the display control portion 114a may display the setting dialog 130 after reducing it on the display screen. In this way, by displaying the reduced setting dialog 130, it is possible to make an area overlapping the input data as small as possible.

A method for controlling display of a setting dialog by the information processing system of the present invention will hereinafter be described in detail.

FIG. 3 is a view showing an example of setting dialog control information for controlling display of the setting dialog 130, where 140 denotes setting dialog control information. The setting dialog control information 140 is stored in the memory 113 or the storage portion 117 in the PC 110, and it is a table in which a window size of the setting dialog 130, a display size, processing in the case of having a plurality of input data, and the like are described.

Taking FIG. 3 as an example, it is possible that an item 141 of a setting dialog stores the number of lateral pixels and the number of vertical pixels of the setting dialog 130, an item 142 of a setting dialog (reduced) stores the number of lateral pixels and the number of vertical pixels when the setting dialog 130 is reduced, an item 143 of a display stores the number of lateral pixels and the number of vertical pixels of a display, and an item 144 of "processing in the case of having a plurality of input data" stores "display so as not to overlap the top input data" or "display so as to overlap the bottom input data".

FIGS. 4A to 4F are views showing an example of input data display information for controlling display of input data, where 150 denotes input data display information. The input data display information 150 shown in FIGS. 4A to 4F is a table in which necessary items (151, 152, 153, and 154) for displaying the setting dialog 130 are described.

Taking FIG. 4A as an example, the item 151 of an image shows an identification number for identifying an image read by the scanner apparatus 120, the item 152 of an image position shows an upper left coordinate of an image, the item 153 of an image size shows vertical and lateral sizes of an image, and an item 154 of a Z order shows a positive integer that indicates a displaying order of images displayed on the large-sized display 100. Here, an image having a smaller value is assumed to be displayed on the upper layer (front side) of the large-sized display 100.

Note that, the setting dialog control information 140 and the input data display information 150 are stored in the storage portion 117 or the memory 113, and can be properly referred to by the control portion 114.

FIGS. 5 to 9 are flowcharts illustrating an example of a method for controlling display of a setting dialog by the information processing system of the present invention. Note that, in the present example, description will be given for a process when the setting dialog 130 shown in FIG. 2 is controlled to be displayed on the large-sized display 100 based on a display state of a document read by the scanner apparatus 120, in the information processing system shown in FIG. 1.

In FIG. 5, a user firstly operates the operation portion 115 of the PC 110 and starts an application to display the setting dialog 130 (step S1). At this time, the control portion 114 acquires the setting dialog control information from the storage portion 117 (step S2).

In the PC 110, after completing acquisition of the setting dialog control information 140, the control portion 114 subsequently acquires the input data display information 150 of input data from the storage portion 117 (step S3). After completing acquisition of the input data display information 150, it is determined whether or not the input data read by the scanner apparatus 120 is displayed on the large-sized display 100 based on the input data display information 150 (step S4).

When it is determined that the input data is displayed on the large-sized display 100 at step S4 (in the case of YES), the PC 110 acquires a display position and a display size of the input data from the input data display information 150 and acquires a display size of the setting dialog 130 from the setting dialog control information 140 (step S5). On the other hand, when the input data is not displayed on the large-sized display 100 at step S4 (in the case of NO), the setting dialog 130 is displayed at the center of the display screen (step S6).

Subsequently, the PC 110 determines whether or not there is an area where the setting dialog 130 can be displayed without overlapping the input data at step S7. Specifically, based on the display size of the setting dialog 130, a display area of the input data on the display screen is scanned to determine whether or not there is an area where the setting dialog 130 can be displayed without overlapping the input data. When it is determined that there is an area where the setting dialog 130 can be displayed without overlapping the input data (in the case of YES), the setting dialog 130 is displayed on a display possible area other than the display area of the input data (step S8). Alternatively, it is determined that there is no area where the setting dialog 130 can be displayed without overlapping the input data at step S7 (in the case of NO), it is determined whether or not there is only one input data displayed on the large-sized display 100 referring to the input data display information 150 (step S9).

Figure 6:
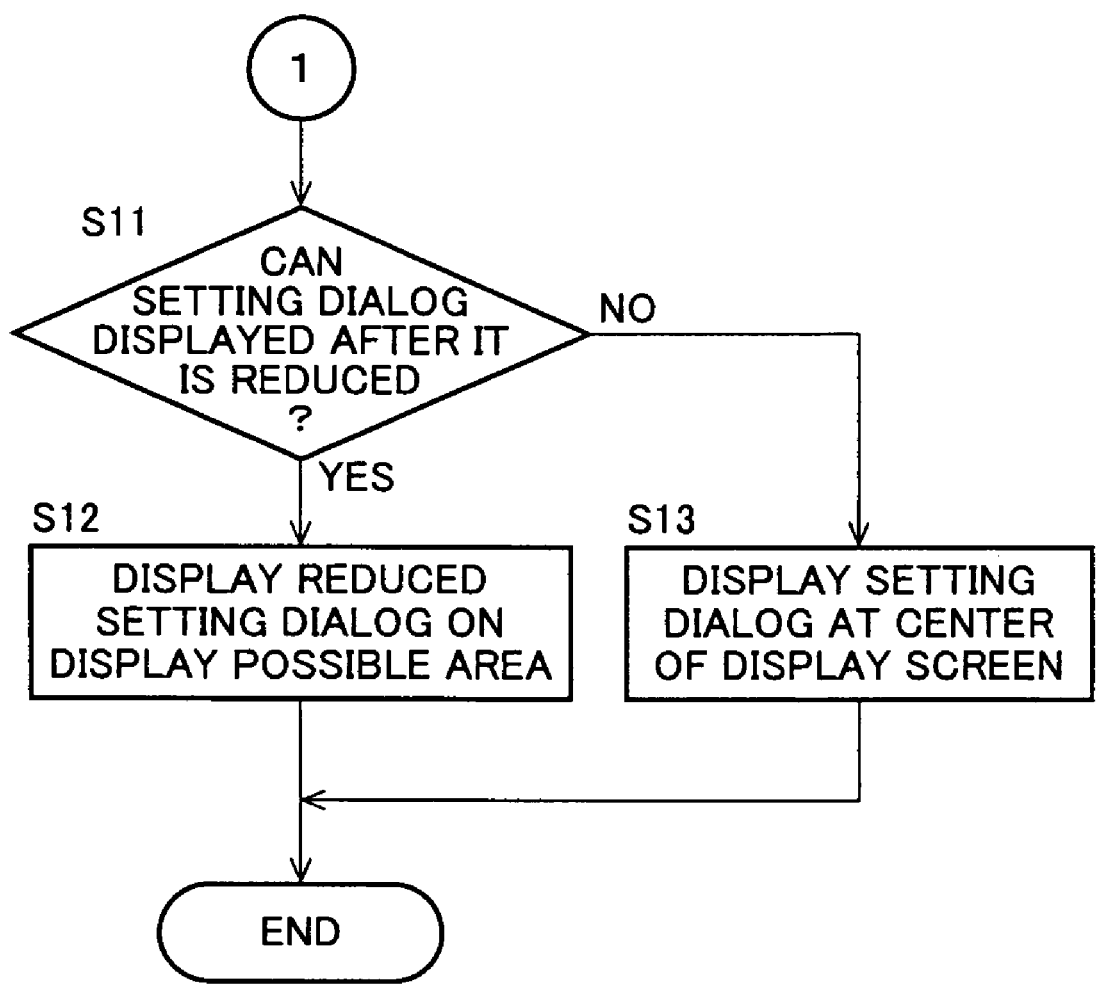
FIG. 6 is a flowchart, subsequent to the flowchart shown in FIG. 5, illustrating an example of the method for controlling display of a setting dialog by the information processing system of the present invention.

When the PC 110 determines that there is only one input data displayed on the large-sized display 100 at step S9 (in the case of YES), the procedure proceeds to step S11 shown in FIG. 6.

In FIG. 6, when it is determined that there is only one input data displayed at step S9 of FIG. 5, the PC 110 determines whether or not the setting dialog 130 can be displayed without overlapping the input data by reducing it, referring to the item 142 of a setting dialog (reduced) in the setting dialog control information 140 (step S11). When it is determined that there is an area where the setting dialog 130 can be displayed without overlapping the input data (in the case of YES), the reduced setting dialog 130 is displayed on the display possible area (step S12). Alternatively, when it is determined that there is no area where the setting dialog 130 can be displayed without overlapping the input data (in the case of NO), the setting dialog 130 is displayed at the center of the display screen (step S13).

Figure 7:
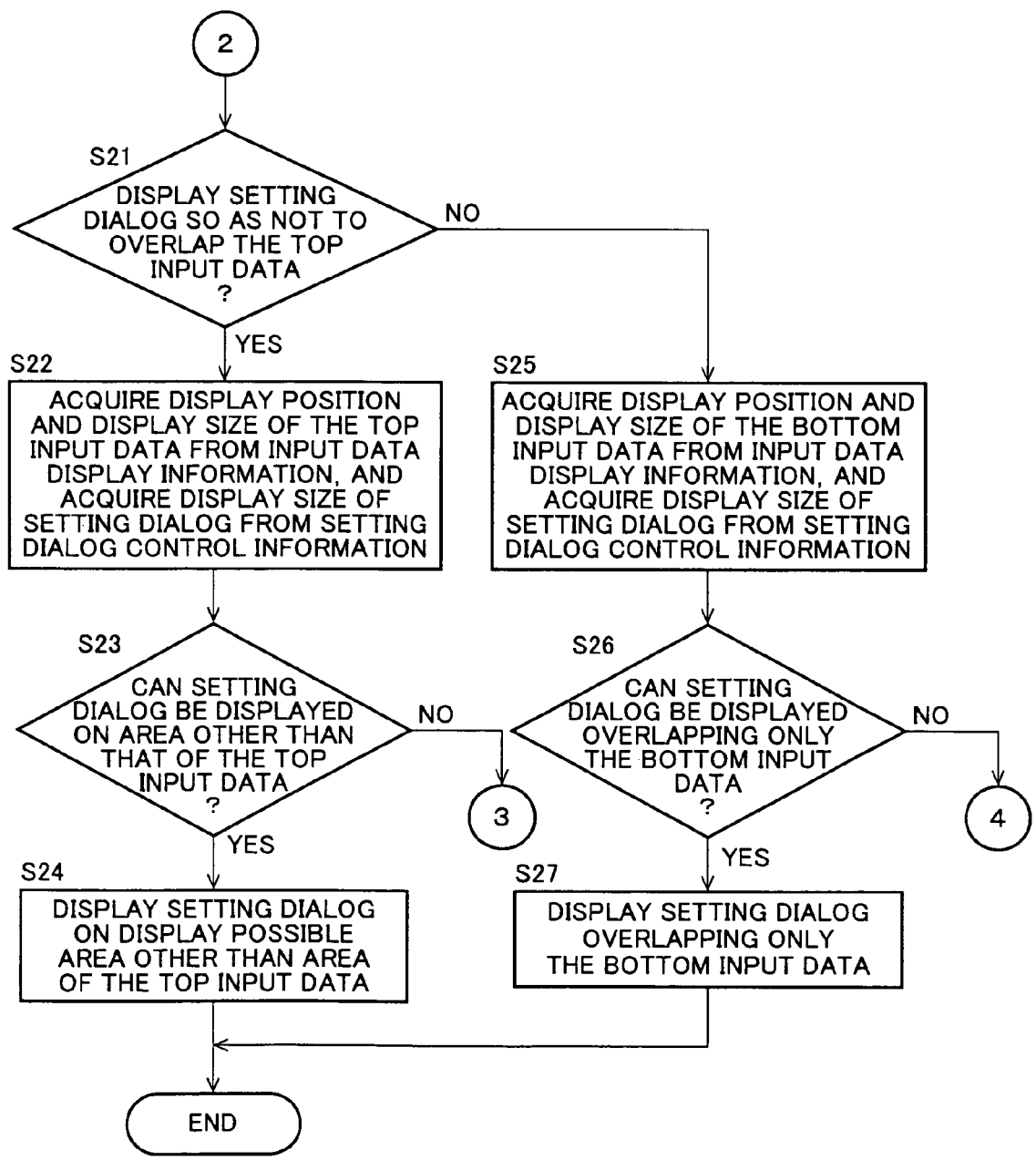
FIG. 7 is a flowchart, subsequent to the flowchart shown in FIG. 5, illustrating an example of the method for controlling display of a setting dialog by the information processing system of the present invention.

Alternatively, when it is determined that there are two or more pieces of input data displayed on the large-sized display 100 at step S9 above (in the case of NO), the procedure proceeds to step S21 shown in FIG. 7.

In FIG. 7, when it is determined that there are two or more pieces of input data at step S9 of FIG. 5, the PC 110 determines whether or not the "display so as not to overlap the top input data" is set in the item 144 of the "processing in the case of having a plurality of input data" in the setting dialog control information 140 (step S21). When it is determined that the "display so as not to overlap the top input data" is set (in the case of YES), then a display position and a display size of the top input data are acquired from the input data display information 150 and a display size of the setting dialog 130 is acquired from the setting dialog control information 140 (step S22).

Subsequently, the PC 110 determines whether or not the setting dialog 130 can be displayed on an area other than that of the top input data (step S23), and when determined that it is possible to display the setting dialog 130 on an area other than that of the top input data (in the case of YES), the setting dialog 130 is displayed on the display possible area other than the area of the top input data (step S24). Alternatively, it is determined that the setting dialog 130 can not be displayed on an area other than that of the top input data at step S23 (in the case of NO), the procedure proceeds to step S31 shown in FIG. 8.

On the other hand, when it is determined that the "display so as not to overlap the top input data" is not set at step S21 above (in the case of NO), a display position and a display size of the bottom input data are acquired from the input data display information 150 and a display size of the setting dialog 130 is acquired from the setting dialog control information 140 (step S25).

The PC 110 determines whether or not the setting dialog 130 can be displayed overlapping only an area of the bottom input data (step S26), and when it is determined that it is possible to display the setting dialog 130 overlapping only the area of the bottom input data (in the case of YES), the setting dialog 130 is displayed overlapping only the area of the bottom input data (step S27). Alternatively, when it is determined that it is impossible to display the setting dialog 130 overlapping only the area of the bottom input data (in the case of NO), the procedure proceeds to step S41 shown in FIG. 9.

Figure 8:
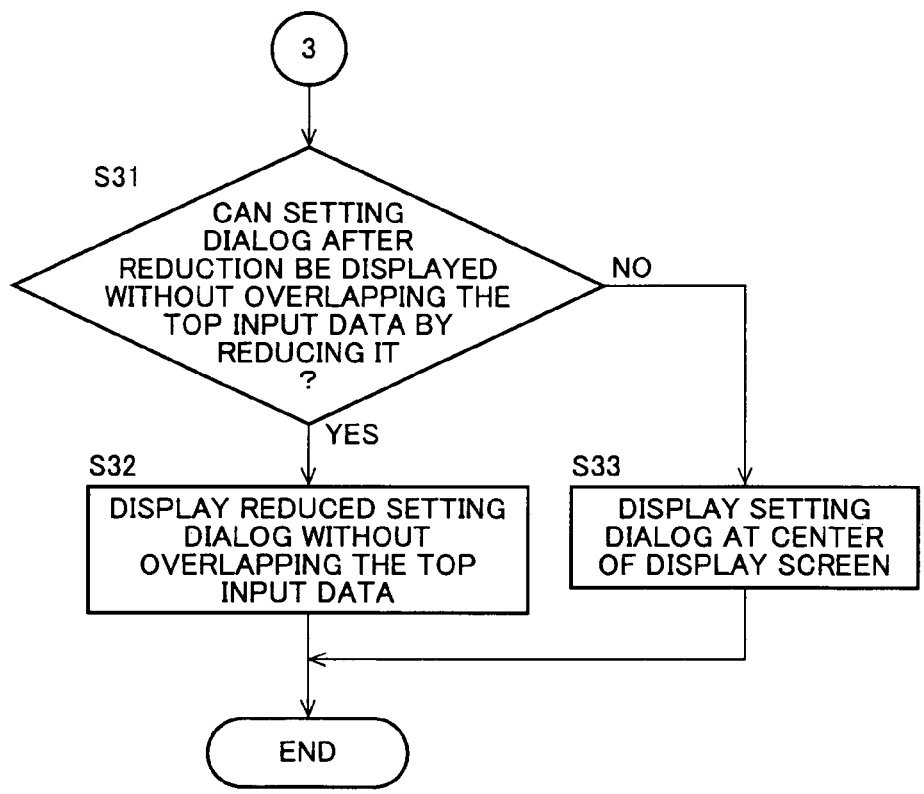
FIG. 8 is a flowchart, subsequent to the flowchart shown in FIG. 7, for illustrating the method for controlling display of a setting dialog by the information processing system of the present invention.

In FIG. 8, when it is determined that it is impossible to display the setting dialog 130 on an area other than that of the top input data at step S23 of FIG. 7, the PC 110 determines whether or not the setting dialog 130 can be displayed without overlapping the top input data by reducing it, referring to the item 142 of the setting dialog (reduction) in the setting dialog control information 140 (step S31). When it is determined that the setting dialog 130 can be displayed without overlapping the top input data (in the case of YES), then the reduced setting dialog 130 is displayed without overlapping the top input data (step S32). Alternatively, when the setting dialog 130 can not be displayed without overlapping the top input data (in the case of NO), the setting dialog 130 is displayed at the center of the display screen (step S33).

Figure 9:
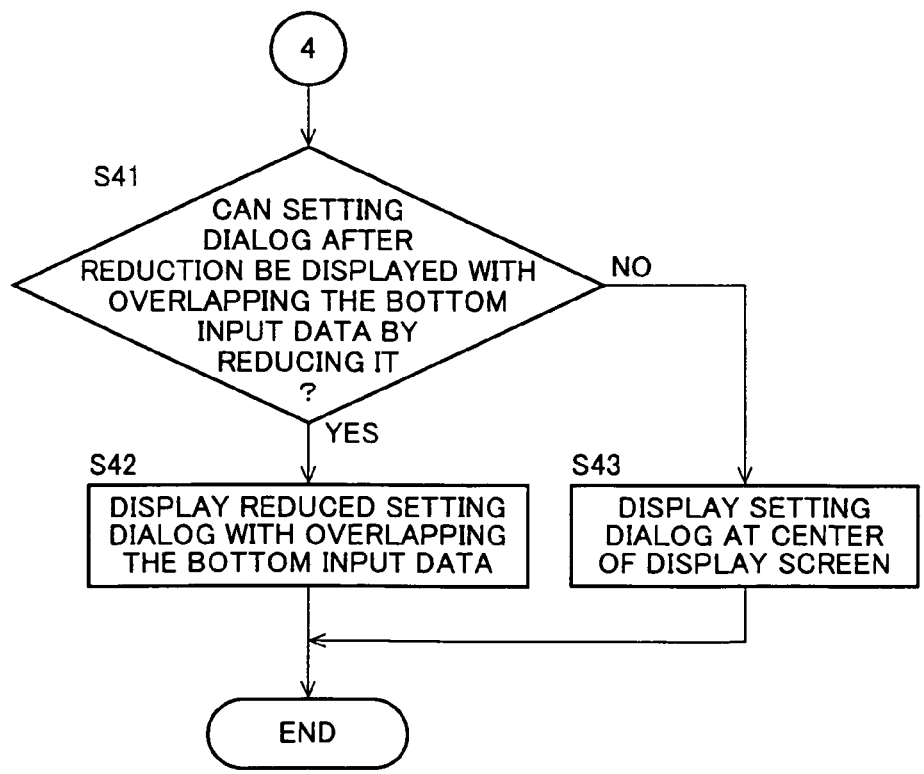
FIG. 9 is a flowchart, subsequent to the flowchart shown in FIG. 7, illustrating an example of the method for controlling display of a setting dialog by the information processing system of the present invention.

In FIG. 9, when it is determined that it is impossible to display the setting dialog 130 overlapping only the area of the bottom input data at step S26 of FIG. 7, the PC 110 determines whether or not the setting dialog 130 can be displayed overlapping the bottom input data by reducing it, referring to the item 142 of the setting dialog (reduction) in the setting dialog control information 140 (step S41). When it is determined that the setting dialog 130 can be displayed overlapping the bottom input data (in the case of YES), then the reduced setting dialog 130 is displayed overlapping the bottom input data (step S42). Alternatively, when the setting dialog 130 can not be displayed overlapping the bottom input data (in the case of NO), the setting dialog 130 is displayed at the center of the display screen (step S43).

FIGS. 10 to 16 are views showing an example of a display state of a setting dialog corresponding to the input data display information shown in FIGS. 4A to 4F.

Figure 10:
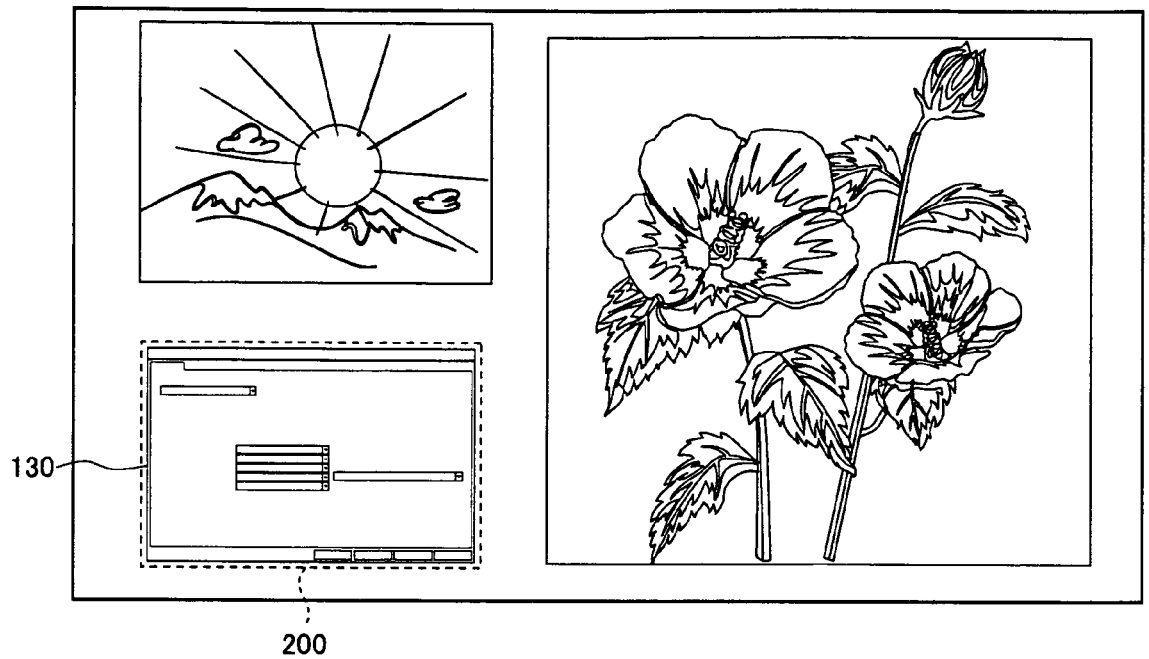
FIG. 10 is a view showing an example of a display state of a setting dialog corresponding to the input data display information shown in FIG. 4A.

In the case of the input data display information shown in FIG. 4A, it is determined that there are two pieces of input data and there is an area where the setting dialog 130 can be displayed without overlapping the input data. Thus, as shown in FIG. 10, the setting dialog 130 is displayed at a display position 200, that is, at the center of an area where it can be arranged without overlapping the display area of the input data.

Figure 11:
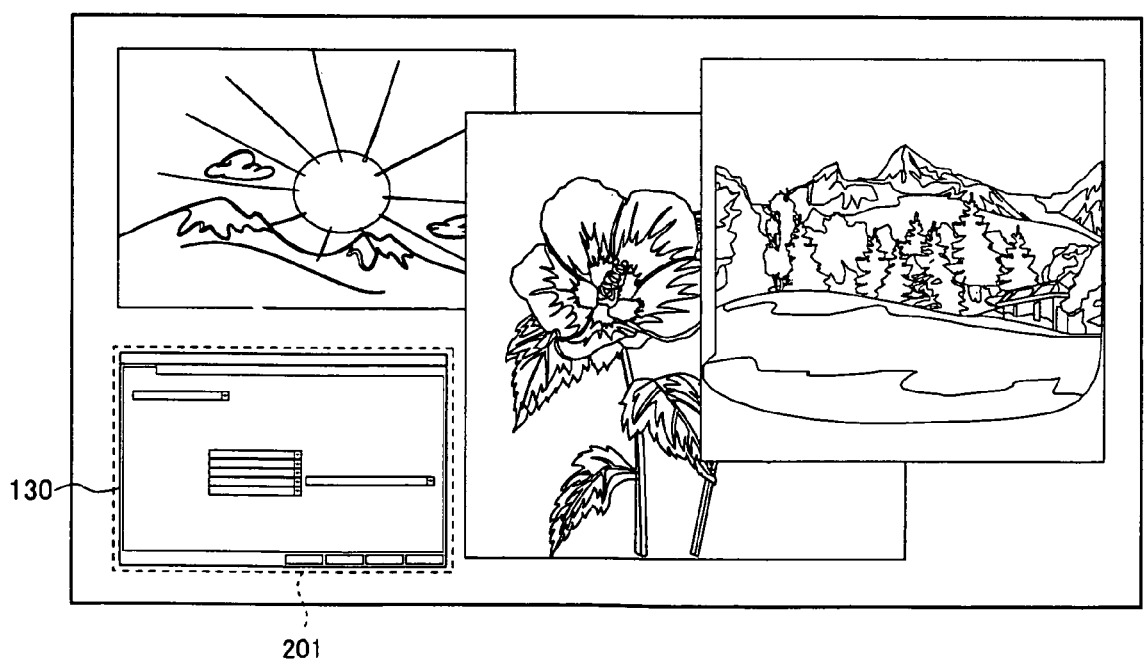
FIG. 11 is a view showing another example of a display state of a setting dialog corresponding to the input data display information shown in FIG. 4B.

In the case of the input data display information shown in FIG. 4B, it is determined that there are three pieces of input data and there is an area where the setting dialog 130 can be displayed without overlapping the input data. Thus, similarly to the above, as shown in FIG. 11, the setting dialog 130 is displayed at a display position 201, that is, at the center of an area where it can be arranged without overlapping the display area of the input data.

Figure 12:
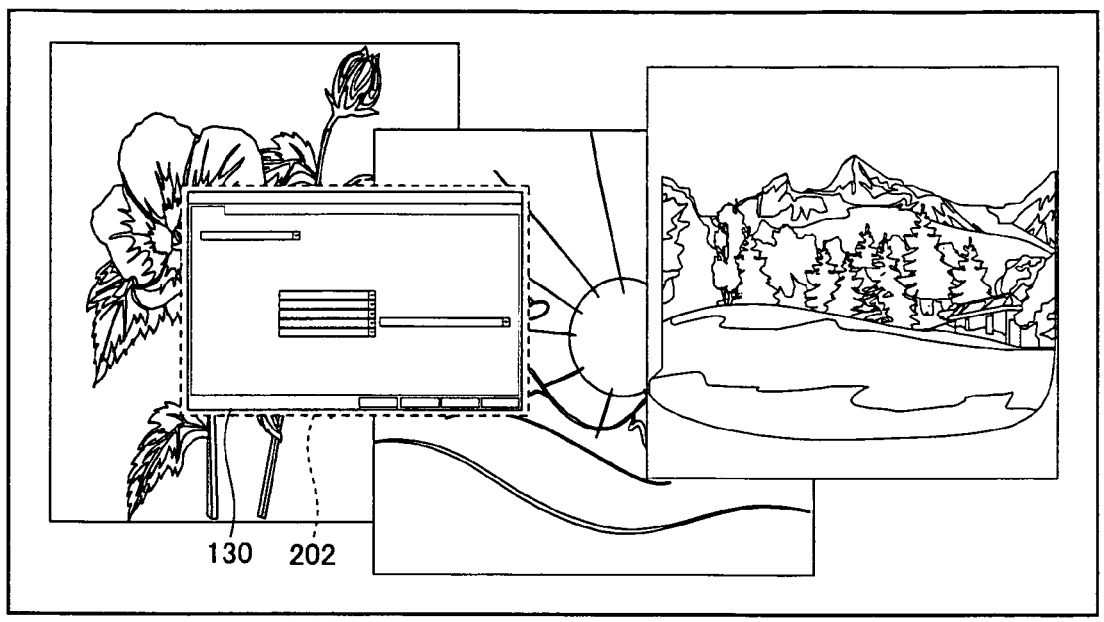
FIG. 12 is a view showing another example of a display state of a setting dialog corresponding to the input data display information shown in FIG. 4C.

In the case of the input data display information shown in FIG. 4C, it is determined that there are three pieces of input data and there is no area where the setting dialog 130 can be displayed without overlapping the input data, and further, the "display so as not to overlap the top input data" is set in the item 144 of the "processing in the case of having a plurality of input data" shown in FIG. 3. Thus, as shown in FIG. 12, the setting dialog 130 is displayed at a display position 202, that is, it is displayed so as not to overlap the input data that is displayed on the top of the overlapping order of the three pieces of input data on the display screen.

Figure 13:
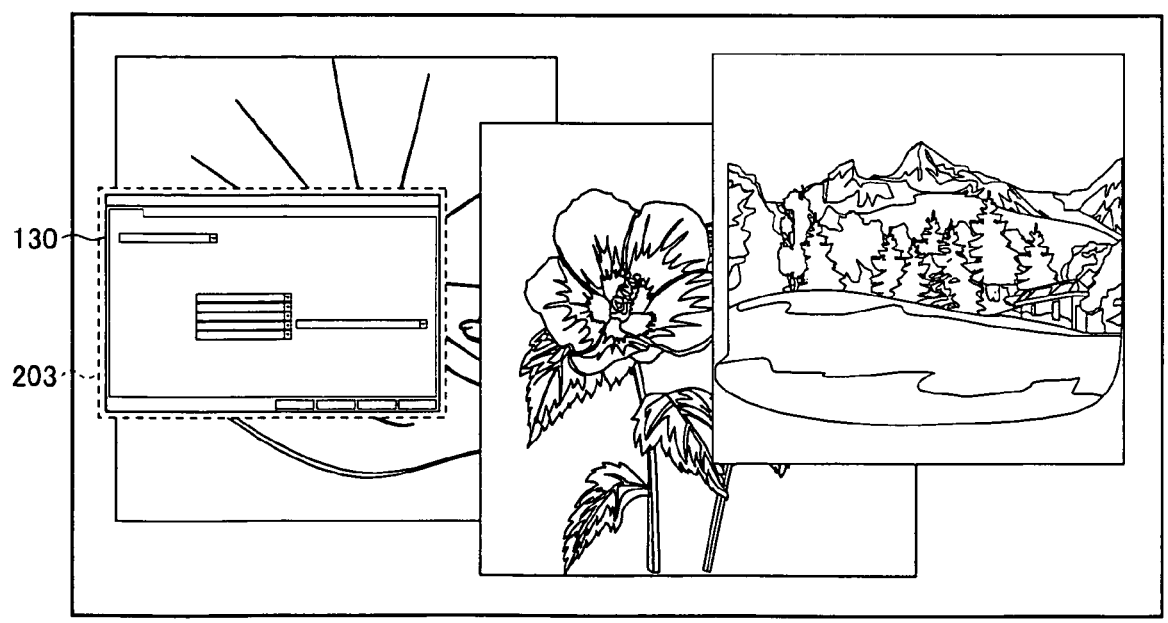
FIG. 13 is a view showing another example of a display state of a setting dialog corresponding to the input data display information shown in FIG. 4C.

On the other hand, when the "display so as to overlap the bottom input data" is set in the item 144 of the "processing in the case of having a plurality of input data", as shown in FIG. 13, the setting dialog 130 is displayed at a display position 203, that is, it is displayed so as to overlap the input data that is displayed on the bottom of the overlapping order of the three pieces of input data on the display screen.

Figure 4D:
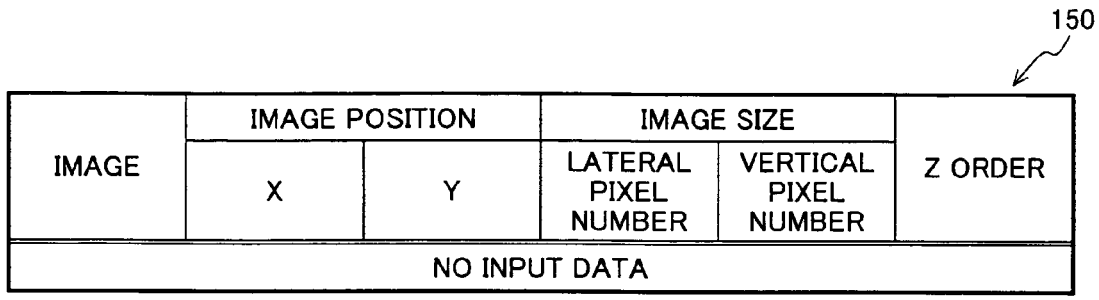
Figure 14:
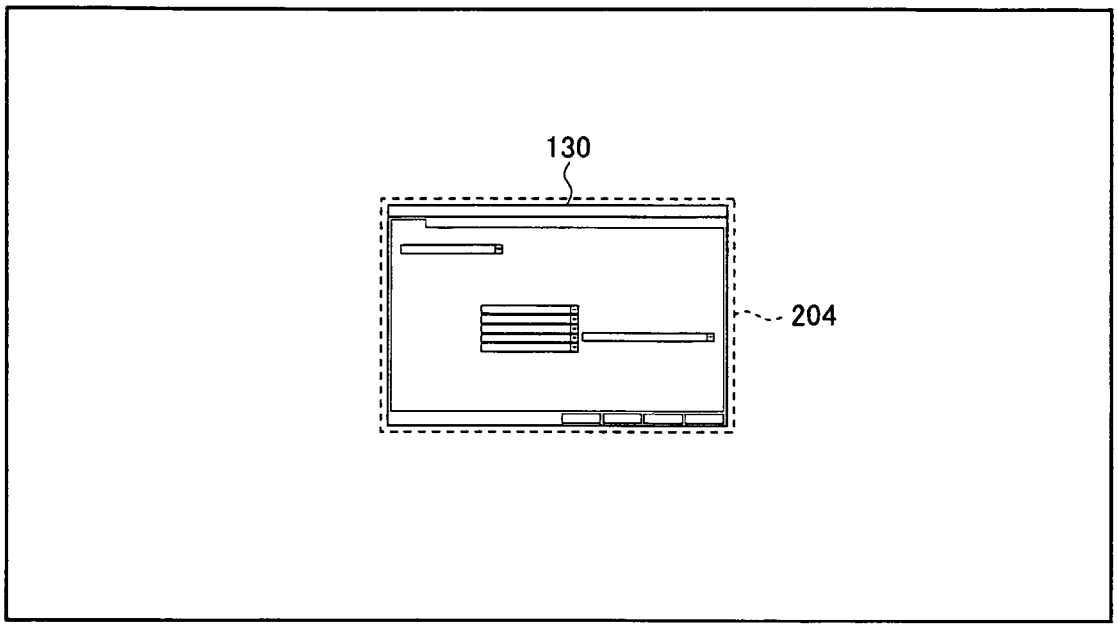
FIG. 14 is a view showing another example of a display state of a setting dialog corresponding to the input data display information shown in FIG. 4D.

In the case of the input data display information shown in FIG. 4D, it is determined that no input data is displayed on the display screen. Thus, as shown in FIG. 14, the setting dialog 130 is displayed at a display position 204, that is, at the center of the display screen.

Figure 4E:
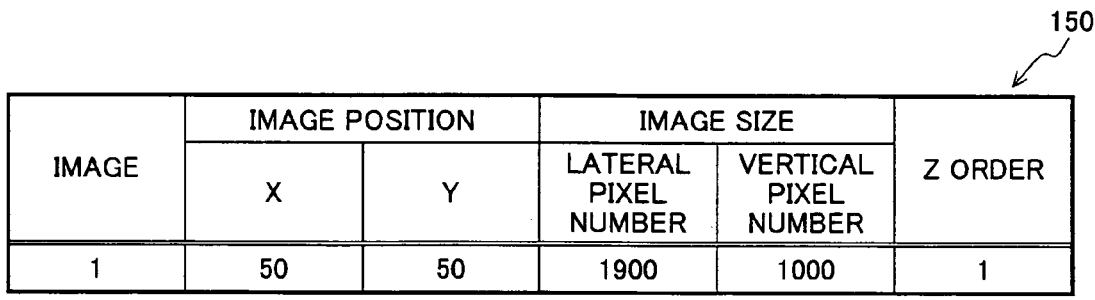
Figure 15:
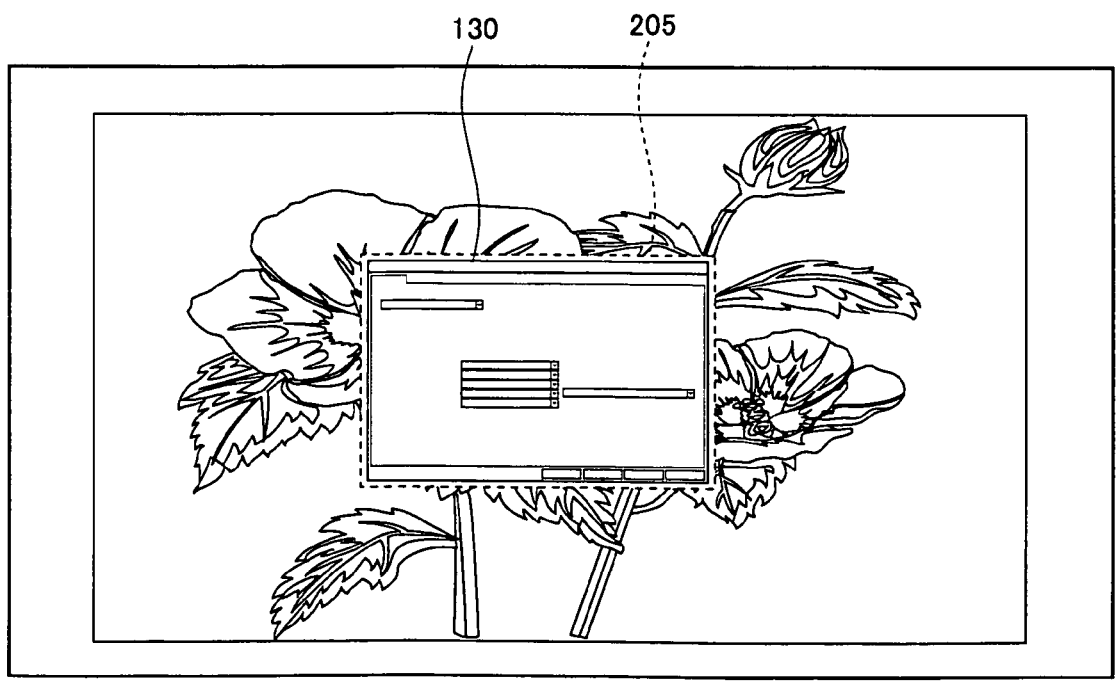
FIG. 15 is a view showing another example of a display state of a setting dialog corresponding to the input data display information shown in FIG. 4E.

In the case of the input data display information shown in FIG. 4E, it is determined that there is one piece of input data and there is no area where the setting dialog 130 can be displayed without overlapping the input data, and further determined that the setting dialog 130 even after reduction overlaps the display area of the input data even by reducing it. Thus, as shown in FIG. 15, the setting dialog 130 is displayed at a display position 205, that is, at the center of the display screen.

Figure 4F:
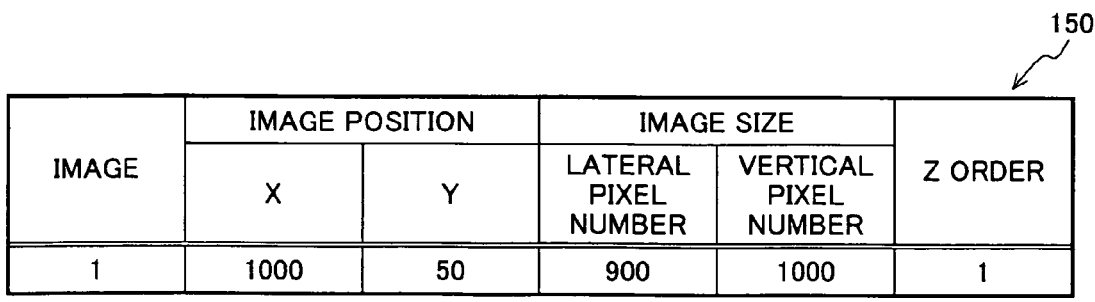
Figure 16:
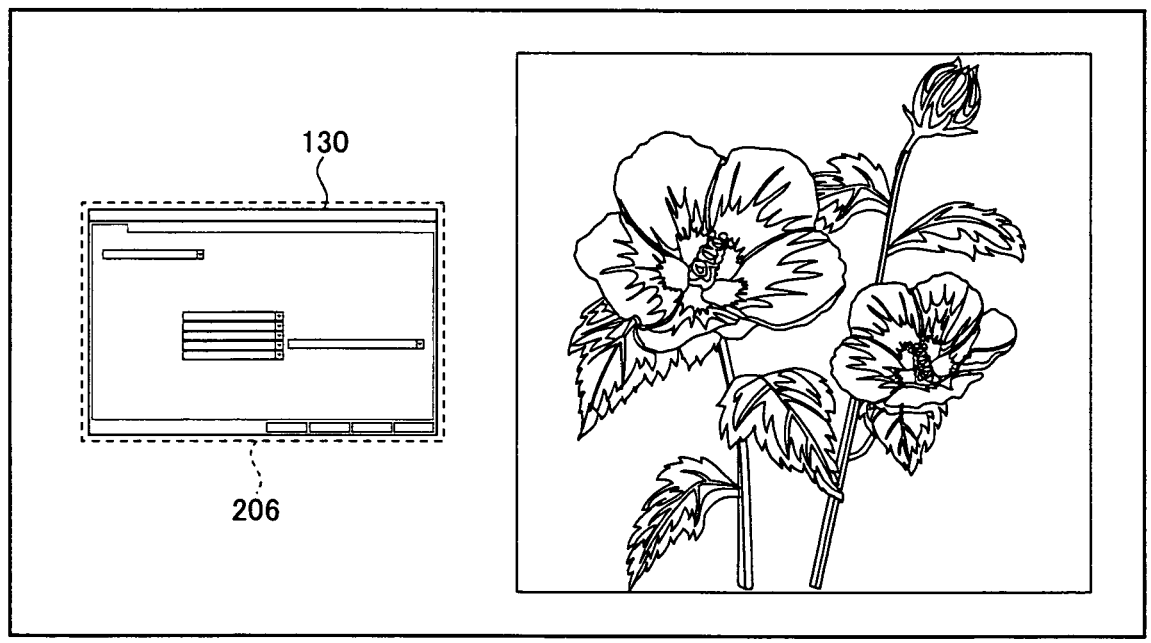
FIG. 16 is a view showing another example of a display state of a setting dialog corresponding to the input data display information shown in FIG. 4F.

In the case of the input data display information shown in FIG. 4F, it is determined that there is one piece of input data and there is an area where the setting dialog 130 can be displayed without overlapping the input data. Thus, as shown in FIG. 16, the setting dialog 130 is displayed at a display position 206, that is, at the center of an area where it can be arranged without overlapping the display area of the input data.

As another embodiment, when displaying a setting dialog, it may be displayed on a lower part than the center of the display screen. When displaying a setting dialog, by displaying the setting dialog on a lower part than the center of a large-sized display screen (for a conference) in this way, a user is able to easily perform setting input.

Furthermore, when displaying a setting dialog, the setting dialog may be minimized temporarily and be displayed in an original size according to a selection instruction given by a user to the minimized setting dialog. This makes it possible to prevent display data (during a conference using the large-sized display screen) from being interrupted when the setting dialog is displayed.

Note that, the aforementioned description of the embodiment of the present invention will not be limited thereto and alternations can be made properly within the scope of the present invention.

For example, although the setting dialog functions to set a scan parameter in the present embodiment, it may be a setting dialog to change settings of an application.

Furthermore, although only the top input data and the bottom input data are used as a determination reference to display a setting dialog overlapping the input data in the present embodiment, a determination reference different from that of the present embodiment may be set, for example, including a display of the setting dialog so as not to overlap the input data which is at the first and the second of the Z order.

According to the present invention, following effects can be obtained.

According to the present invention, a display state of input data and a setting dialog on a display screen is determined and the setting dialog is displayed at an appropriate position based on a determination, and thereby, it is possible to prevent the input data such as conference materials from being interrupted by the setting dialog, for example, when displaying the setting dialog on a large-sized display in a conference or the like.

The invention claimed is:

1. An information processing system, comprising:
    a data input apparatus for inputting data; and
    an information processing apparatus for displaying input data input by the data input apparatus on a display screen, wherein
    the information processing apparatus includes a display control portion for displaying the input data and a setting dialog for setting predetermined conditions relating to the input data on the display screen, and a display state determining portion for determining a display state of the input data and the setting dialog, and
    the display control portion controls a display position of the setting dialog based on a determination result by the display state determining portion,
    when the display state determining portion determines that the input data is not displayed on the display screen, or that the input data is displayed on the display screen and there is no area where the setting dialog can be displayed without overlapping the input data, then the display control portion displays the setting dialog at the center of the display screen,
    when the display state determining portion determines that there are a plurality of input data displayed on the display screen and there is no area where the setting dialog can be displayed without overlapping the plurality of input data, and the display state determining portion further determines an overlapping order of the plurality of input data, then the display control portion controls the display position of the setting dialog based on a determination result of the overlapping order by the display state determining portion.

2. The information processing system as defined in claim 1, wherein
    the display control portion displays the setting dialog so as not to overlap the input data displayed on the top of the overlapping plurality of input data on the display screen.

3. The information processing system as defined in claim 1, wherein
    the display control portion displays the setting dialog so as to overlap the input data displayed on the bottom of the overlapping plurality of input data on the display screen.

4. The information processing system as defined in claim 1, wherein
    the data input apparatus is a document reading apparatus that optically reads a document and inputs data.

5. The information processing system as defined in claim 4, wherein
    the setting dialog permits setting of a parameter relating to reading conditions when the document reading apparatus reads a document.

6. The information processing system as defined in claim 1, wherein
    the display screen is a display screen of an external display apparatus connected to the information processing apparatus.

7. An information processing apparatus which constitutes the information processing system as defined in claim 1.

* * * * *